US006963617B1

(12) United States Patent
Armour et al.

(10) Patent No.: US 6,963,617 B1
(45) Date of Patent: Nov. 8, 2005

(54) OFDM RECEIVER WITH ADAPTIVE EQUALIZER

(75) Inventors: Simon Armour, Bath (GB); David Roger Bull, Nr. Chepstow (GB); Andrew Robert Nix, Bristol (GB)

(73) Assignee: University of Bristol, Bristol (GB)

( * ) Notice: Subject to any disclaimer, the term of this patent is extended or adjusted under 35 U.S.C. 154(b) by 0 days.

(21) Appl. No.: 09/913,840

(22) PCT Filed: Jan. 24, 2000

(86) PCT No.: PCT/GB00/00174

§ 371 (c)(1),
(2), (4) Date: Feb. 11, 2002

(87) PCT Pub. No.: WO00/44144

PCT Pub. Date: Jul. 27, 2000

(30) Foreign Application Priority Data

Jan. 22, 1999 (GB) .................................... 9901491

(51) Int. Cl.[7] .......................................... H04L 27/28
(52) U.S. Cl. ...................................... 375/260; 375/350
(58) Field of Search .............................. 375/233, 232, 375/231, 230, 229, 234, 130, 136, 260, 350; 370/203, 208, 210

(56) References Cited

U.S. PATENT DOCUMENTS

| 4,247,940 | A | * | 1/1981 | Mueller et al. ............. 375/214 |
| 5,285,474 | A | * | 2/1994 | Chow et al. ................ 375/231 |
| 5,796,814 | A | * | 8/1998 | Brajal et al. ................ 375/232 |
| 6,408,038 | B1 | * | 6/2002 | Takeuchi .................... 375/341 |
| 6,493,395 | B1 | * | 12/2002 | Isaksson et al. ............ 375/261 |
| 6,693,958 | B1 | * | 2/2004 | Wang et al. ................ 375/232 |
| 6,775,334 | B1 | * | 8/2004 | Liu et al. .................... 375/341 |
| 2002/0037058 | A1 | * | 3/2002 | Birru .......................... 375/340 |
| 2003/0007554 | A1 | * | 1/2003 | Birru .......................... 375/233 |

FOREIGN PATENT DOCUMENTS

| EP | 0 797 814 A1 | 9/1997 |
| GB | 2 325 825 A | 12/1998 |
| GB | 2 326 070 A | 12/1998 |

OTHER PUBLICATIONS

Armour, S. et al., "Pre-FFT equalizer design for OFDM," Electronics Letters, vol. 35, No. 7, pp. 539-540, Apr. 1, 1999.
Armour,S., et al, "Performance Analysis of a Pre-FFT Equalizer Design for DVB-T," IEEE Transactions on Consumer Electronics, vol. 45, No. 3, pp. 544-552, Aug. 1999.
Armour, S., et al., "Performance Analysis of a Pre-FFT Equalizer Design for DVB-T," Digest of Technical Papers, Int'l Conference on Consumer Electronics , pp. 72-73, Jun. 24, 1999.
Armour, S., et al., "The Impact of FFT Size on the Performance of a Combined OFDM-Equalization Radio Modem," IEEE VTS 50th Vehicular technology Conference, vol. 3, pp. 1506-1510, 1999.

* cited by examiner

Primary Examiner—Betsy L. Deppe
(74) Attorney, Agent, or Firm—Townsend and Townsend and Crew LLP

(57) ABSTRACT

An OFDM receiver includes an adaptive equalizer, which acts on a received signal, after conversion to digital samples. After filtering by the equalizer, any guard interval is removed, and a Fast Fourier Transform is applied to the signal. The data signal is then estimated and the estimated data is supplied as an output. The estimated data also has any guard interval reinserted, and is applied to an Inverse Fast Fourier Transform, and is fed back to the equalizer to allow adaptation of the tap coefficients thereof.

6 Claims, 4 Drawing Sheets

OFDM RECEIVER WITH ADAPTIVE EQUALIZER

This invention relates to a receiver, and in particular to an OFDM receiver, and to an adaptive equalizer for use in such a receiver and to a method of training the equalizer.

The European digital terrestrial television standard, DVB-T, specifies orthogonal frequency division multiplexing, OFDM as the modulation scheme.

In conventional OFDM systems, multipath radio transmission channels cause delay spread distortion of the transmitted signal. Although adaptive equalizers can be used in many applications to cancel out delay spread distortion, existing designs for OFDM receivers and adaptive equalizers are generally incompatible, although it has been proposed to use a number of equalizers acting in parallel on respective sub-bands of the OFDM signal.

Therefore, existing designs for OFDM systems employ guard intervals to combat the effects of delay spread. Each transmission period includes a period during which useful information is transmitted, and a guard interval, during which no useful information is transmitted. Thus, use of a guard interval reduces efficiency of the transmission, and less data can be transmitted within a given radio frequency bandwidth.

The present invention relates to an OFDM receiver including an adaptive equalizer, which attempts to overcome the incompatibility of existing designs of OFDM receivers and adaptive equalizers.

According to a first aspect of the present invention, there is therefore provided a receiver as defined in claim 1.

For a better understanding of the present invention, reference will now be made to the accompanying drawings, in which:—

DETAILED DESCRIPTION OF PREFERRED EMBODIMENTS

Figure 1:
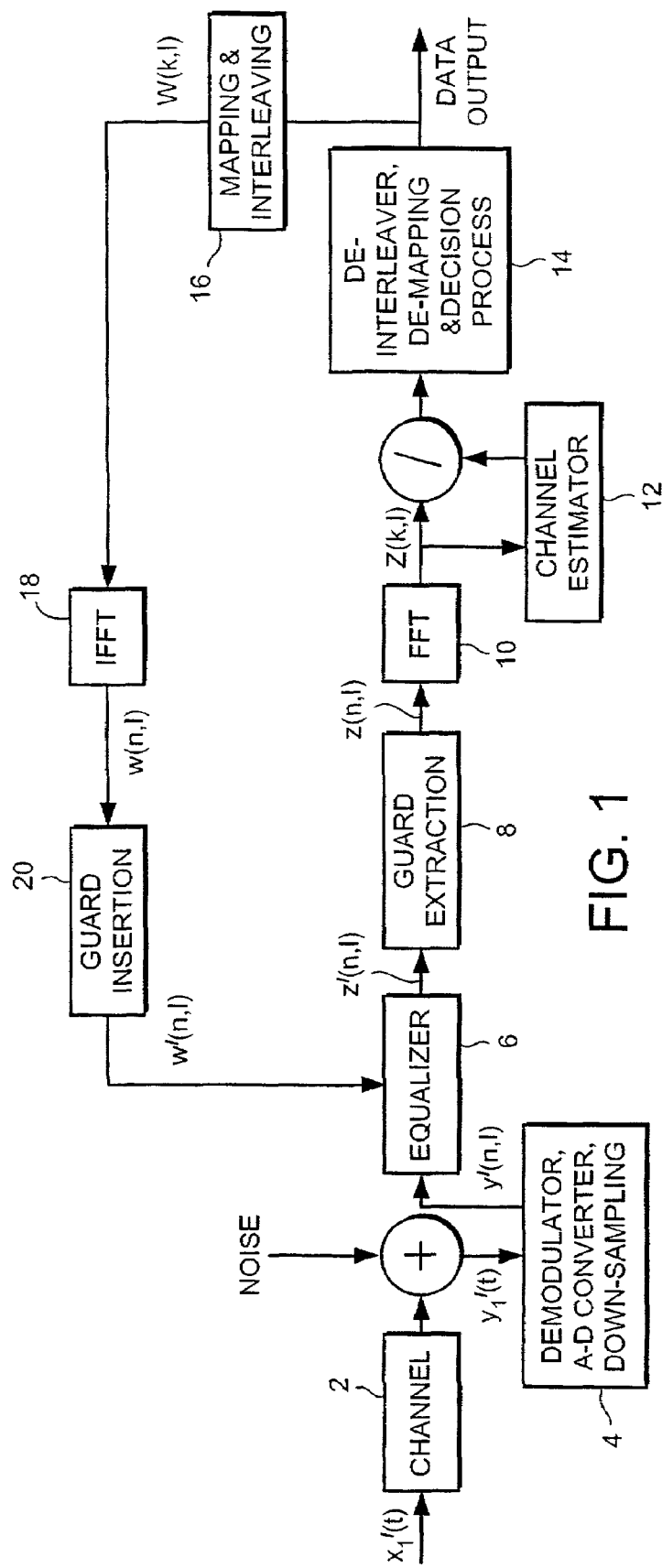
FIG. 1 shows a first receiver in accordance with the invention.

As Shown in FIG. 1, a transmitted analog OFDM symbol is received over a radio frequency channel 2 having unknown and time-varying characteristics, and is subject to the addition of noise.

The receiver therefore takes an input signal $y_1'(t)$ in an input device 4, where it is demodulated, A-D converted and down-sampled to give a time domain vector $y'(n,l)$. The received sequence $y'(n,l)$ is filtered by an adaptive equalizer 6 to produce a time-domain sequence $z'(n,l)$.

The time domain sequence output from the equalizing filter 6 is input to a guard extraction device 8 to form an output $z(n,l)$, An advantage of the present invention is that the need for a guard interval may be reduced or eliminated. The guard extraction device 8 is therefore required only if it is needed if a guard interval is used by the transmitter which is in use.

A Fast Fourier Transform (FFT) 10 is then applied to $z(n,l)$ to produce a frequency domain vector $Z(k,l)$.

In this embodiment of the invention, the frequency domain vector is supplied to a channel estimator 12 which derives an estimation of the radio channel's frequency response and compensates according to this estimate. In an alternative embodiment, the channel estimator may be omitted.

The vector is then supplied to an output device 14 to produce a data output. The output device 14 may be nothing more than a hard limiter, putting the data into a useable form. However, any interleaving, coding, signal mapping or other error control strategies applied in the transmitter are reversed in the output device 14 and exploited to correct any errors and produce the output data sequence. The output data, which is the best possible estimate of the data content of the transmitted signal is then applied to a feedback loop, and processed to form the best possible estimate of the transmitted sequence. Specifically, the data output is applied to a device 16 which interleaves, codes and maps the data in an identical manner to that performed at the transmitter to produce the frequency domain sequence $W(k,l)$.

The frequency domain sequence is input to an inverse Fourier transform device 18 and the output $w(n,l)$ of this device is applied to a guard interval insertion device 20 to insert a guard interval corresponding to any that was added in the transmitter to generate a sequence $w'(n,l)$. In effect, the data output is processed in the feedback loop to effectively attempt to reconstruct the OFDM symbol that was generated at the transmitter, and hence $w'(n,l)$ is an estimate of the transmitted sequence $x'(n,l)$. The estimate $w'(n,l)$ is then input to the equalizing filter 6 to enable decision directed adaptation of the tap coefficients thereof.

Each updated estimate of an OFDM symbol, made up of a number of sub-symbols, is available to the equalizer only after all sub-symbols of one OFDM symbol have been received.

Figure 2:
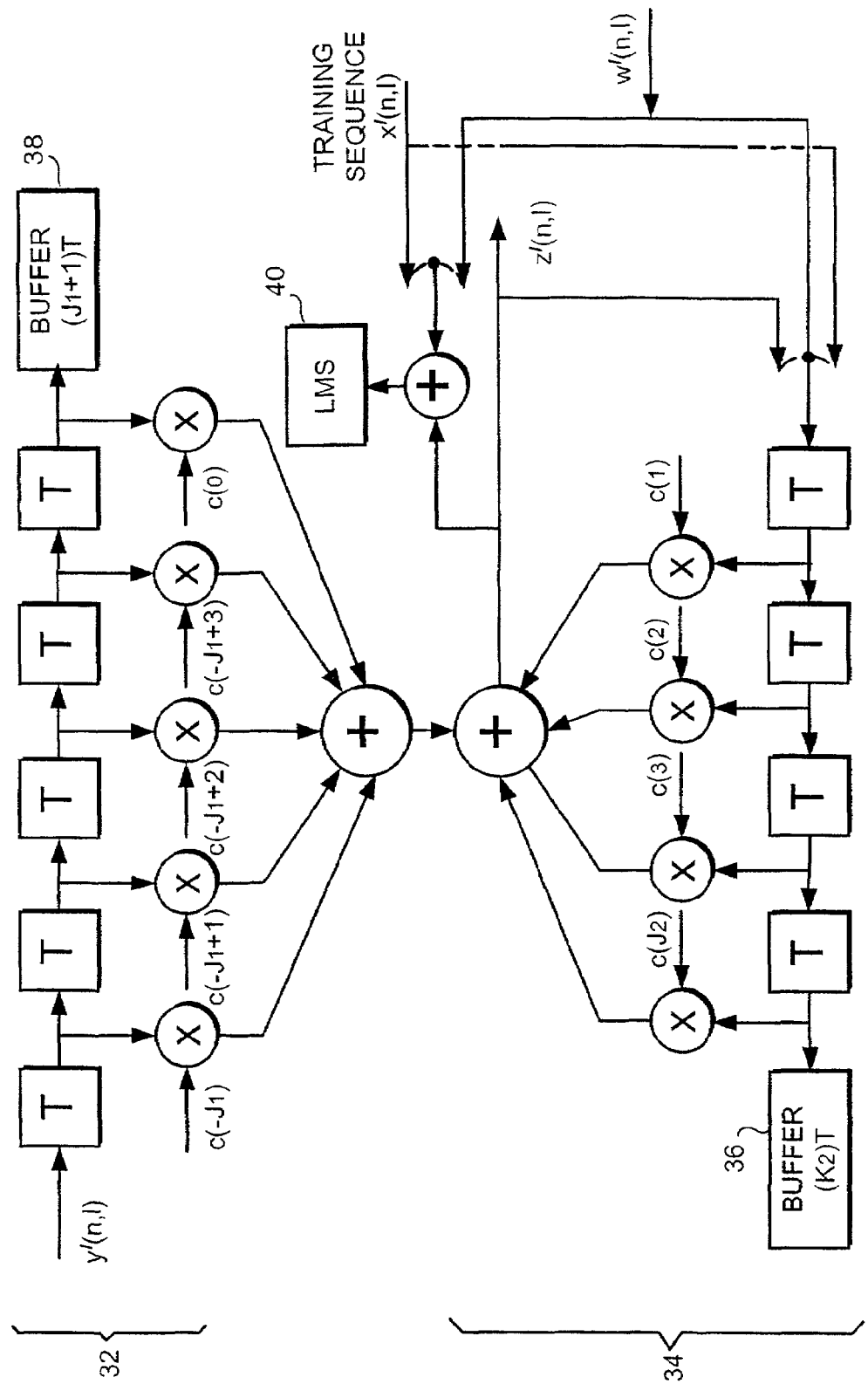
FIG. 2 shows a first equalizer in accordance with the invention.

FIG. 2 shows the equalizer of the present invention. As is generally conventional, the equalizer consists of two shift register sections: a feedforward section 32 that stores future transmission symbols and the current transmission symbol and a feedback section 34 that stores previous transmission symbols. The length of the feedforward section is $(J_1+1)$ symbols and the length of the feedback section is J2 symbols. The received sequence $y'(n,l)$ is input, the value of each stored symbol is multiplied by a tap coefficient $c(j)$, and the results are summed to form the equalizer output $z'(n,l)$.

The tap coefficients $c(j)$ are updated according to the LMS adaptation algorithm. As is known, the LMS algorithm adapts the equalizer taps according to the error measure between the equalizer output symbols and an estimate of the transmitted symbols. The estimate of the transmitted symbols can be achieved either by means of a training sequence or by decision directed adaptation.

Adaptation according to a training sequence requires the transmission of symbols of which the equalizer has prior knowledge. This training mode allows adaptation according to an error free estimate of transmitted symbols but results in no data throughput.

Decision directed adaptation feeds back output data to estimate the transmitted symbols. This estimate is not necessarily error free but does allow for data throughput.

In practice, the two techniques are combined. An initial training sequence approximately adapts the equalizer and reduces equalizer output error sufficiently that decision directed adaptation may provide an adequate error measurement for further adaptation. During decision directed adaptation the equalizer further adapts both to 'fine tune' its action and to track any relatively small time variation in the radio channel.

The equalizer of FIG. 2 is generally similar to a conventional equalizer, although there are differences as follows:—

Symbols input to the feedback register 32 during decision directed operation do not come directly from the decision device but rather from the feedback vector.

Symbols used to calculate error during decision directed operation come similarly from the feedback vector rather than direct from the decision device.

Additional buffers 36, 38 for both feedforward and feedback sections further store past symbols beyond the duration of the feedforward/feedback sections. These additional stored values are required for decision directed adaptation.

During decision directed mode the tap coefficients are not updated at intervals of the sub-symbol period, but rather at the OFDM symbol period, regarding one OFDM symbol as made up a group of sub-symbols.

However, the LMS calculation is performed in the LMS calculation processor 40 to calculate adjustments corresponding to intervals of the sub-symbol period with the sum of all calculated adjustments being made at intervals of the OFDM symbol period.

The equalizer output may be directly input to the feedback section thereof.

These additional features, which apply during a decision directed (or data derived) operation, enable the equalizer to operate within the OFDM receiver architecture.

More detailed explanation of all these features is given below.

Since the equalizer operates on the received time domain sequence its output is also a time domain sequence. Data in the OFDM modem is in the frequency domain and hence the equalizer output must be Fourier Transformed (with any guard interval first being removed) prior to the decision process. Thus, the output of the equalizer cannot be applied directly to the decision device. Similarly the decision device output cannot be fed back directly to the equalizer. The feedback vector is fed back instead. If the equalizer is adapting according to a training sequence this is irrelevant, since the training sequence itself is an error free estimate of the transmitted sequence and can be input to the equalizer's feedback section. Furthermore, the decision device output cannot be used to calculate the output error used in the LMS adaptation algorithm and the feedback vector is again used instead.

The additional symbol buffering and the changes to the adaptation process in decision directed mode are necessary since the parallel transmission undertaken in OFDM results in the group post-decision data sub-symbols making up one OFDM symbol being simultaneously output at intervals of the OFDM symbol period. (By contrast, a single carrier system outputs individual symbols at intervals of the symbol period.) This restriction imposed by the parallel transmission prevents decision directed adaptation during OFDM symbols. It also prevents feedback values becoming available to the equalizer until the end of the OFDM symbol.

Therefore, instead of adapting the equalizer with each transmission sub-symbol, all transmission symbols forming the OFDM symbol are clocked through the equalizer with the tap coefficients remaining constant and the equalizer output is input directly into the feedback section. At the end of each OFDM symbol the past and future transmission symbols that were stored in the feedforward and feedback sections at the start of the OFDM symbol are recovered from the buffers. Since the tap coefficients remain constant throughout the OFDM symbol the equalizer is effectively returned to its state at the start of the OFDM symbol. The OFDM symbol is then clocked into the equalizer once more with the feedback OFDM symbol now available both for determination of error and input to the feedback section. This process enables the adaptation steps that had not previously taken place to be completed and replaces the fed back output symbols with post decision estimates of the transmitted symbols as provided by the feedback OFDM symbol.

This method of operation described above allows both the feedforward and feedback stages of the equalizer to have numbers of taps which are integer multiples of the length of the extended OFDM symbol, which is considered to be (N+M), with N the number of transmission symbols in the useful period of an OFDM symbol, and M the number of transmission symbols in the guard period. In this illustrated embodiment, these numbers of taps are equal to the length of the extended OFDM symbol.

The equalizer output is then given by:—

$$z'(n, l) = \sum_{j=-J_1}^{-J_1+n} c(j)y'((n-j-(N+M)), l+1) + \sum_{j=-J_1+n+1}^{D} c(j)y'((n-j), l) +$$

$$C_{out}(n)\sum_{j=1}^{n} c(j)z'((n-j), l) + \sum_{j=n+1}^{J_2} c(j)w'((n+(N+M)-j), l-1)$$

where:

$C_{out}(n) = 0$ for $n = 0$ and:

$C_{out}(n) = 1$ for $n \neq 0$

The equalizer is then adapted according to the LMS algorithm, which in this case is defined as follows:—

During Training Mode:

$c(j, n+1, l) = c(j, n, l) + \Delta\varepsilon'(n, l)y*((n-j-(N+M)), l+1)$ for $-J_1 \leq j \leq -J_1 + n + 1$ $c(j, n+1, l) = c(j, n, l) + \Delta\varepsilon'(n, l)y*((n-j), l)$ for $-J_1 + n + 2 \leq j \leq 0$ $c(j, n+1, l) = c(j, n, l) + \Delta\varepsilon'(n, l)x*((n-j), l)$ for $1 \leq j \leq n$ $c(j, n+1, l) = c(j, n, l) + \Delta\varepsilon'(n, l)x*((n+(N+M)-j), l-1)$ for $1 \leq j \leq n$ $c(j, n+1, l) = c(j, n, l) + \Delta\varepsilon'(n, l)x*((n+(N+M)-j), l-1)$ for $n + 1 \leq j \leq J_2$ $\varepsilon'(n, l) = x'(n, l) - z'(n, l)$ During Decision Directed Operation $$c(j, n, l+1) = c(j, n, l) + C_{ff}(j)\sum_{n=0}^{N+M-j-1} \Delta\varepsilon'(n, l)w'((n+(N+M)-j), l) +$$

$$\sum_{n=N+M+j}^{N+M-1} \Delta\varepsilon'(n, l)y'((n-(N+M)-j), l+1)$$

for $-J_1 \leq j \leq 0$

Figure 3:
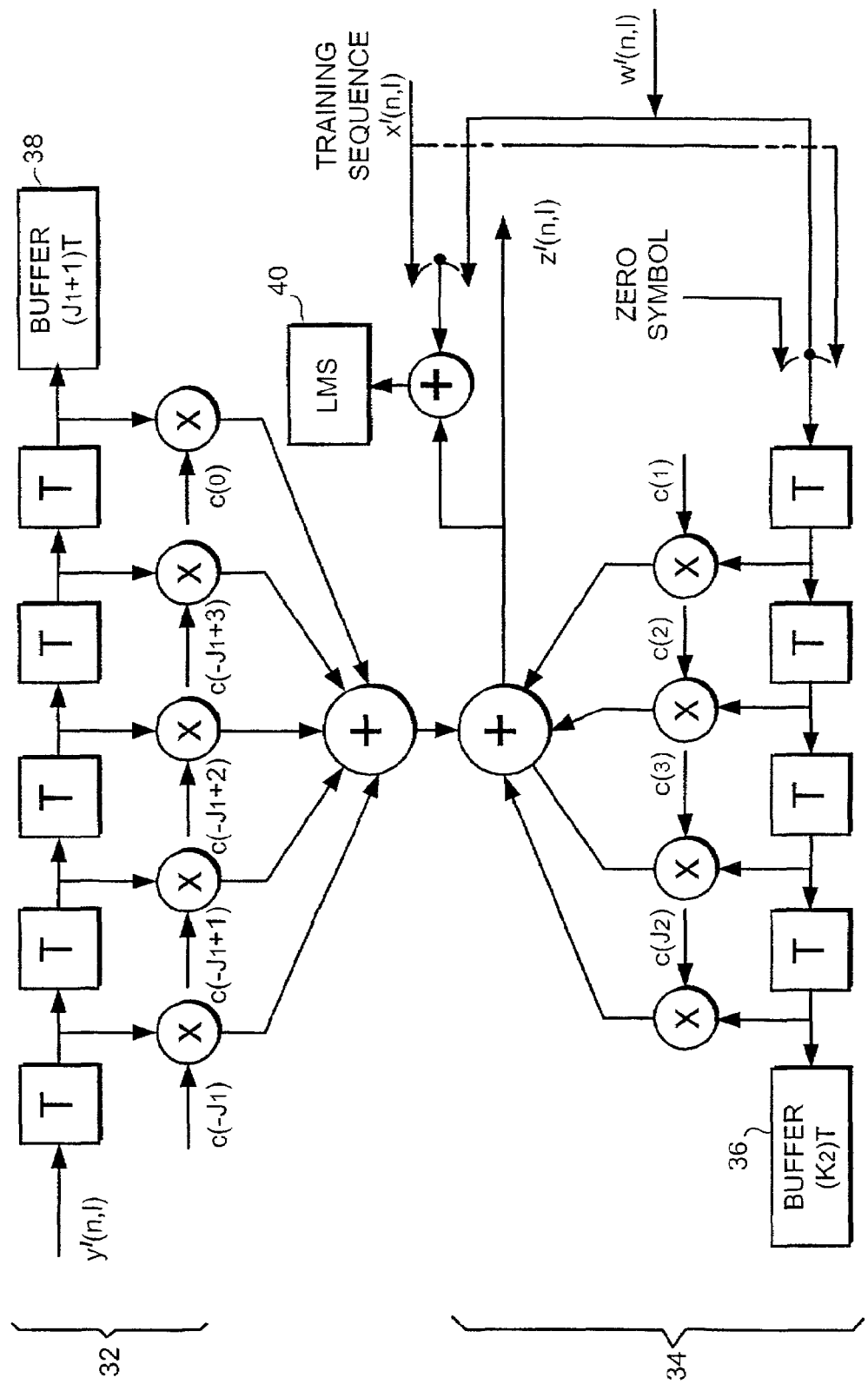
FIG. 3 shows a second equalizer in accordance with the invention.

-continued $$c(j, n, l+1) = c(j, n, l) + \sum_{n=0}^{j-1} \Delta \varepsilon'(n, l) w'((n + (N+M) - j), l-1) +$$

$$C_{fb}(j) \sum_{n=j}^{N+M-1} \Delta \varepsilon'(n, l) w'((n-j), l)$$

for $1 \leq j \leq J_2$ $\varepsilon'(n, l) = w'(n, l) - z'(n, l)$ where:

$C_{ff}(j) = 0$ for $-j = N + M$ and:

$C_{ff}(j) = 1$ for $-j \neq N + M$ $C_{ff}(j) = 0$ for $-j = N + M$ and:

$C_{ff}(j) = 1$ for $j \neq N + M$ $\Delta$ Equalizer step constant $c(j, n, l)$ Equalizer tap vector in OFDM system $\varepsilon(n, l)$ Equalizer output error vector in OFDM system FIG. 3 shows an alternative equalizer in accordance with the invention. It corresponds generally to that of FIG. 2, except that the symbols input to the equalizer's feedback section 34 are zero symbols. This prevents the feedback of noise bearing symbols into the equalizer but, as a consequence, the equalizer no longer cancels delay spread distortion from within the same OFDM symbol. However this will still allow for an effective transmission strategy since, for example, where a guard interval is employed, delay spread interference within the same OFDM symbol does not cause inter-carrier interference (ICI). Thus, an equalizer with zero symbol feedback may be combined with a channel estimation process to achieve cancellation of delay spread distortion without the need to feed back pre-decision transmission symbols.

Thus, in FIG. 3, compared with FIG. 2, the feedback path from the equalizer output directly to the feedback section is replaced by a zero symbol source.

The equalizer output then becomes:—

$C_{out}(n) = 0$, for all n.

The method of tap adaptation in the equalizer of FIG. 3 is the same as that described above with reference to FIG. 2.

Figure 4:
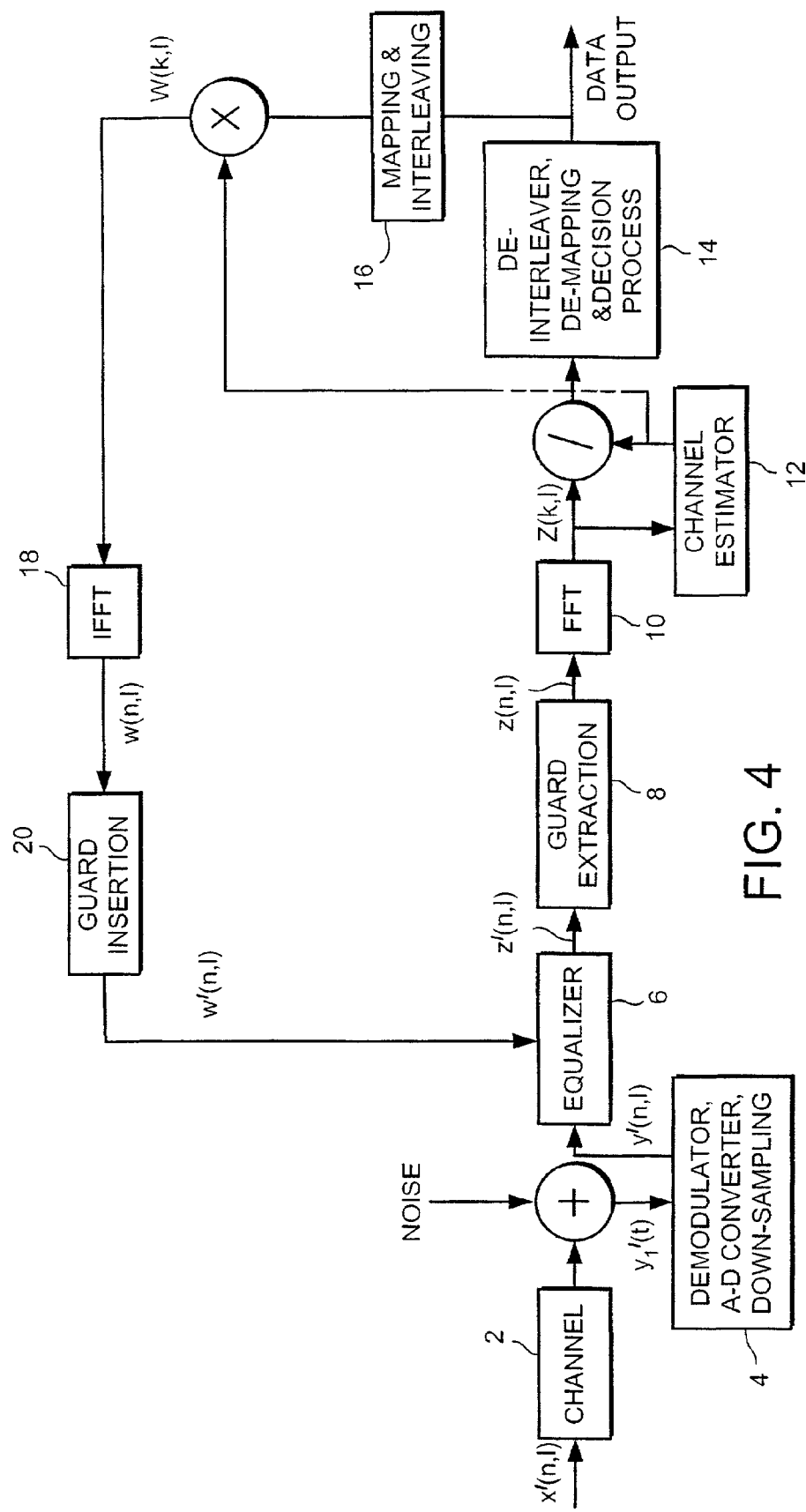
FIG. 4 shows a second receiver in accordance with the invention.

The equalizer is no longer required to cancel all delay spread distortion and hence the equalizer output is not expected to approximate the transmitted sequence. The receiver is therefore as shown in FIG. 4, as the feedback vector must be adjusted to compensate the uncombatted distortion. This is achieved by reversing the channel compensation process in the feedback path. Thus the channel estimate produced by the channel estimator 12 is applied in reverse to the output of mapping and interleaving device 16. This achieves a feedback vector which is suitably adjusted.

There is thus described a receiver, and an equalizer, which allow adaptive equalization of OFDM signals, with a consequent improvement in the noise in the received signals.

What is claimed is:

1. An OFDM receiver, comprising:
   a received signal processor, for demodulating, A-D converting, and down-sampling received signals to form a time domain digital signal vector;
   an equalizer, having at least a feedback section and having a plurality of tap coefficients, the equalizer acting on the time domain digital signal vector to form a filtered time domain sequence;
   a Fast Fourier Transform processor, for acting on the filtered time domain sequence to form a frequency domain vector;
   an output device, for converting the frequency domain vector into an output data signal;
   an inverse Fast Fourier Transform processor, for acting on the output data signal to form an estimate of the transmitted sequence;
   wherein the estimate of the transmitted sequence is supplied as an input to the equalizer to enable decision directed adaptation of the tap coefficients thereof, and further as an input to the feedback section of the equalizer.

2. An OFDM receiver as claimed in claim 1, further comprising:
   a guard extraction device, for extracting any guard sequence from the filtered time domain sequence before processing by the Fast Fourier Transform processor; and
   a guard insertion device, for inserting a guard interval, corresponding to that removed by the guard extraction device, into the estimate of the transmitted sequence supplied by the inverse Fast Fourier Transform processor.

3. An OFDM receiver as claimed in claim 1, further comprising:
   a channel estimator, for compensating the frequency domain vector to produce a compensated frequency domain vector.

4. An OFDM receiver as claimed in claim 1, wherein the output device comprises means for exploiting and cancelling any error control strategies applied in a transmitter of the received signals, and further comprising:
   means for reapplying to the output data signal any error control strategies cancelled in the output device.

5. An OFDM receiver as claimed in claim 4, wherein the output device comprises means for deinterleaving a compensated frequency domain vector.

6. An OFDM receiver as claimed in claim 4, wherein the output device comprises means for demapping a compensated frequency domain vector.

* * * * *